(12) United States Patent
Yoshihama

(10) Patent No.: US 8,001,149 B2
(45) Date of Patent: Aug. 16, 2011

(54) DOCUMENT MANAGING SYSTEM, DOCUMENT USE CONTROLLER, DOCUMENT STORAGE DEVICE, DOCUMENT MANAGING METHOD, AND COMPUTER READABLE MEDIUM FOR UPDATING INDEX INFORMATION AT A STORAGE DEVICE IN RESPONSE TO CHANGE OF INDEX USE PERMIT/INHIBIT INFORMATION AT A DOCUMENT USE CONTROLLER

(75) Inventor: Taro Yoshihama, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 522 days.

(21) Appl. No.: 12/110,506

(22) Filed: Apr. 28, 2008

(65) Prior Publication Data
US 2009/0089323 A1  Apr. 2, 2009

(30) Foreign Application Priority Data
Sep. 28, 2007  (JP) .................................. 2007-255238

(51) Int. Cl.
G06F 17/30 (2006.01)
(52) U.S. Cl. .................... 707/787; 707/741; 707/640
(58) Field of Classification Search .................. 707/640, 707/741, 787, 999.009, 999.107, 999.002, 707/999.204
See application file for complete search history.

(56) References Cited

U.S. PATENT DOCUMENTS

| 6,301,567 B1 * | 10/2001 | Leong et al. ..................... 705/33 |
| 7,031,954 B1 * | 4/2006 | Kirsch ........................... 707/731 |
| 7,206,934 B2 * | 4/2007 | Pabla et al. .................... 713/168 |
| 7,305,405 B2 * | 12/2007 | Katsurabayashi et al. ............ 1/1 |
| 7,437,023 B2 * | 10/2008 | King et al. ..................... 382/305 |

FOREIGN PATENT DOCUMENTS

| JP | 2001-344245 A | 12/2001 |
| JP | 2003-44479 A | 2/2003 |
| JP | 2003-173329 A | 6/2003 |
| JP | 2004-30056 A | 1/2004 |
| JP | 2004-502987 A | 1/2004 |
| JP | 2004-164555 A | 6/2004 |
| JP | 2004-185095 A | 7/2004 |
| JP | 2005-085113 A | 3/2005 |
| JP | 2005-258796 A | 9/2005 |
| JP | 2006-227916 A | 8/2006 |
| JP | 2007-052557 A | 3/2007 |
| WO | 01/44973 A2 | 6/2001 |

OTHER PUBLICATIONS

Japanese Office Action dated Jan. 26, 2010 in Japanese Application No. 2007-255238.
Japanese Office Action dated Jun. 22, 2010, for Application No. 2007-255238.

* cited by examiner

*Primary Examiner* — Leslie Wong
(74) *Attorney, Agent, or Firm* — Sughrue Mion, PLLC

(57) ABSTRACT

A document managing system includes: a document use controller; and a document storage device, the document use controller including: a managing unit; and an instructing information transmitting unit, and the document storage device including: an index information holding unit; an instructing information receiving unit; and an index information updating unit, wherein the index information updating unit updates an index information so as to change the permission/inhibition of the use of contents of the storage document on the basis of an identifier of a storage document included in instructing information received by the instructing information receiving unit.

2 Claims, 6 Drawing Sheets

| OBJECT DOCUMENT IDENTIFIER | INDEX USE PERMIT/INHIBIT INFORMATION | STORAGE PLACE INFORMATION |
|---|---|---|
| ABCD-0123 | PERMISSION | folder1 / document1 |
| EFGH-4567 | INHIBITION | folder1 / document2 |
| | | folder2 / document2 |
| ⋮ | ⋮ | ⋮ |

*FIG. 3*

| OBJECT DOCUMENT IDENTIFIER | INDEX USE PERMIT/INHIBIT INFORMATION | STORAGE PLACE INFORMATION |
|---|---|---|
| ABCD-0123 | PERMISSION | folder1 / document1 |
| EFGH-4567 | INHIBITION | folder1 / document2 |
|  |  | folder2 / document2 |
| ⋮ | ⋮ | ⋮ |

DOCUMENT MANAGING SYSTEM, DOCUMENT USE CONTROLLER, DOCUMENT STORAGE DEVICE, DOCUMENT MANAGING METHOD, AND COMPUTER READABLE MEDIUM FOR UPDATING INDEX INFORMATION AT A STORAGE DEVICE IN RESPONSE TO CHANGE OF INDEX USE PERMIT/INHIBIT INFORMATION AT A DOCUMENT USE CONTROLLER

CROSS-REFERENCE TO RELATED APPLICATIONS

This application is based on and claims priority under 35 U.S.C. 119 from Japanese Patent Application No. 2007-255238 filed Sep. 28, 2007.

BACKGROUND

1. Technical Field

The present invention relates to a document managing system, a document use controller, a document storage device, a document managing method and a computer readable medium.

2. Related Art

There is a document use controller that controls a permission or an inhibition of the use of a document as an object (an object document). Such a document use controller has information (a use rule) about the permission or the inhibition of the use of the object document, decides the permission or the inhibition of the use of the object document on the basis the held use rule in response to a request from a user terminal that tries to use the object document, and informs the user terminal of a result. The object document is controlled by a method, for instance, encoding contents thereof so that the object document cannot be used when there is no permission of the use of the document. When the document use controller is employed, for instance, a creator of the object document or a person having a copyright of the object document can permit only an authorized user to use the document in accordance with the use rule even after the object document itself is distributed to a user.

On the other hand, there is a document storage device that stores the document by itself. The document storage device stores and accumulates a plurality of documents (storage documents) as objects to be stored. The document storage device transmits the storage document to the user terminal, displays or edits the storage document in accordance with the request of the user.

When the document is managed by these devices, the object document to be controlled by the document use controller may be sometimes stored in the document storage device as the storage document. In this case, when the document storage device carries out a process to the object document that is stored, the document storage device previously inquires the document use controller about whether or not the process can be permitted to be carried out, and carries out the process only when the document storage device receives an information of a permission of use.

SUMMARY

According to an aspect of the present invention, a document managing system includes: a document use controller that holds information about the permission/inhibition of the use of an object document; and a document storage device that stores a plurality of storage documents including a storage document corresponding to the object document, the document use controller including: a managing unit that coordinates together and manages an identifier of the object document, index use permit/inhibit information that determines whether or not the contents of the object document are used as index information, and an identifier of the storage document corresponding to the object document; and an instructing information transmitting unit that transmits instructing information including the identifier of the storage document coordinated with the index use permit/inhibit information to the document storage device in accordance with the change of the index use permit/inhibit information, and the document storage device including: an index information holding unit that holds the index information including the contents of the plurality of storage documents; an instructing information receiving unit that receives the instructing information transmitted from the document use controller; and an index information updating unit that updates the index information held by the index information holding unit, wherein the index information updating unit updates the index information so as to change the permission/inhibition of the use of the contents of the storage document on the basis of the identifier of the storage document included in the instructing information received by the instructing information receiving unit.

BRIEF DESCRIPTION OF THE DRAWINGS

Exemplary embodiment of the present invention will be described in detail based on the following figures, wherein:

FIG. 3 is an explanatory view showing one example of the contents of object document managing information held by a document use controller;

DETAILED DESCRIPTION

Figure 1:
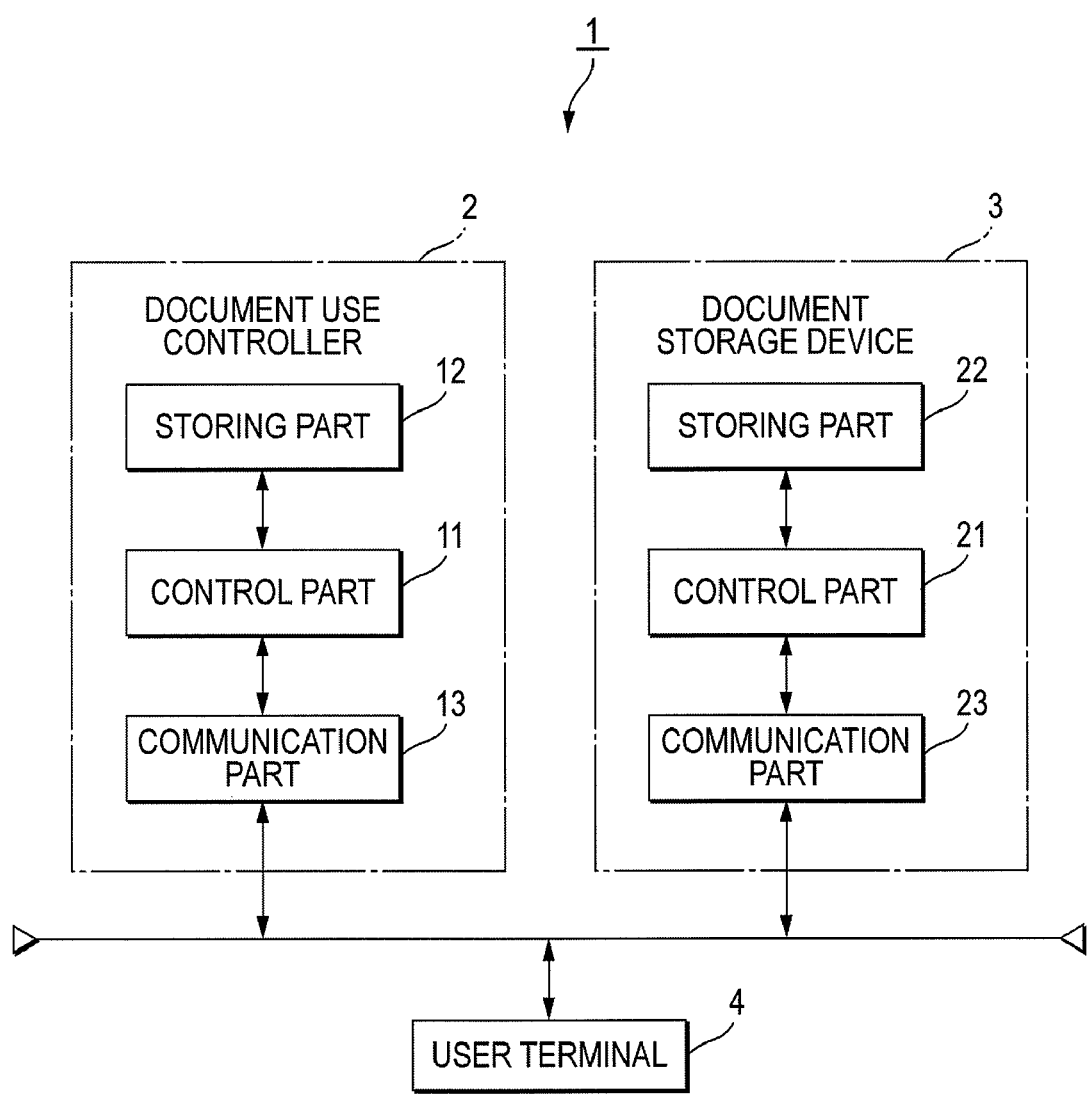
FIG. 1 is a block diagram showing a schematic structure of a document managing system according to an embodiment of the present invention.

Now, an embodiment of the present invention will be described below by referring to the drawings. A document managing system 1 according to one embodiment of the present invention includes, as shown in FIG. 1, a document use controller 2 and a document storage device 3. The document use controller 2 and the document storage device 3 are connected together through a communication unit such as a LAN (Local Area Network). Further, a user terminal 4 used by a user of the document managing system 1 is connected to the document use controller 2 and the document storage device 3 through the communication unit.

The document use controller 2 is a server computer or the like and includes, as shown in FIG. 1, a control part 11, a storing part 12 and a communication part 13.

The control part 11 is a CPU or the like to execute various kinds of information processes in accordance with a program stored in the storing part 12. A specific example executed by the control part 11 will be described below.

The storing part 12 includes a memory element such as a RAM or a ROM, and a hard disk. The storing part 12 holds the program executed by the control part 11 or various kinds of data. Further, the storing part 12 also operates as a work memory of the control part 11. The program stored in the storing part 12 may be provided by storing in various kinds of information storing media such as a CD-ROM or a DVD-ROM that can be read by a computer or provided through a communication unit such as an internet.

The communication part 13 is, for instance, a network interface to transmit and receive information between the document storage device 3 and the user terminal 4 through the communication unit.

The document use controller 2 holds information about the permission or the inhibition of a use of at least one object document Dt as an object whose use is controlled in the storing part 12. Then, when the document storage device 3 or the user terminal 4 transmits a request for using the object document Dt, the document use controller 2 decides whether or not the object document Dt can be used in accordance with the held information and informs a transmission source of the request for use of a result thereof.

The document storage device 3 is a server computer or the like and includes, as shown in FIG. 1, a control part 21, a storing part 22 and a communication part 23. The control part 21, the storing part 22 and the communication part 23 may respectively have the same structures as those of the control part 11, the storing part 12 and the communication part 13.

The document storage device 3 stores a plurality of storage documents Ds in the storing part 22. The plurality of storage documents Ds includes at least one corresponding to the object document Dt as the object whose use is controlled by the document use controller 2.

The user terminal 4 is, for instance, a personal computer and is used when the user of the document managing system 1 newly stores a document in the document storage device 3 or when the user uses the storage document Ds stored in the document storage device 3. In FIG. 1, one user terminal 4 is connected to the document use controller 2 and the document storage device 3, however, a plurality of user terminals 4 may be connected to them respectively for users.

Figure 2:
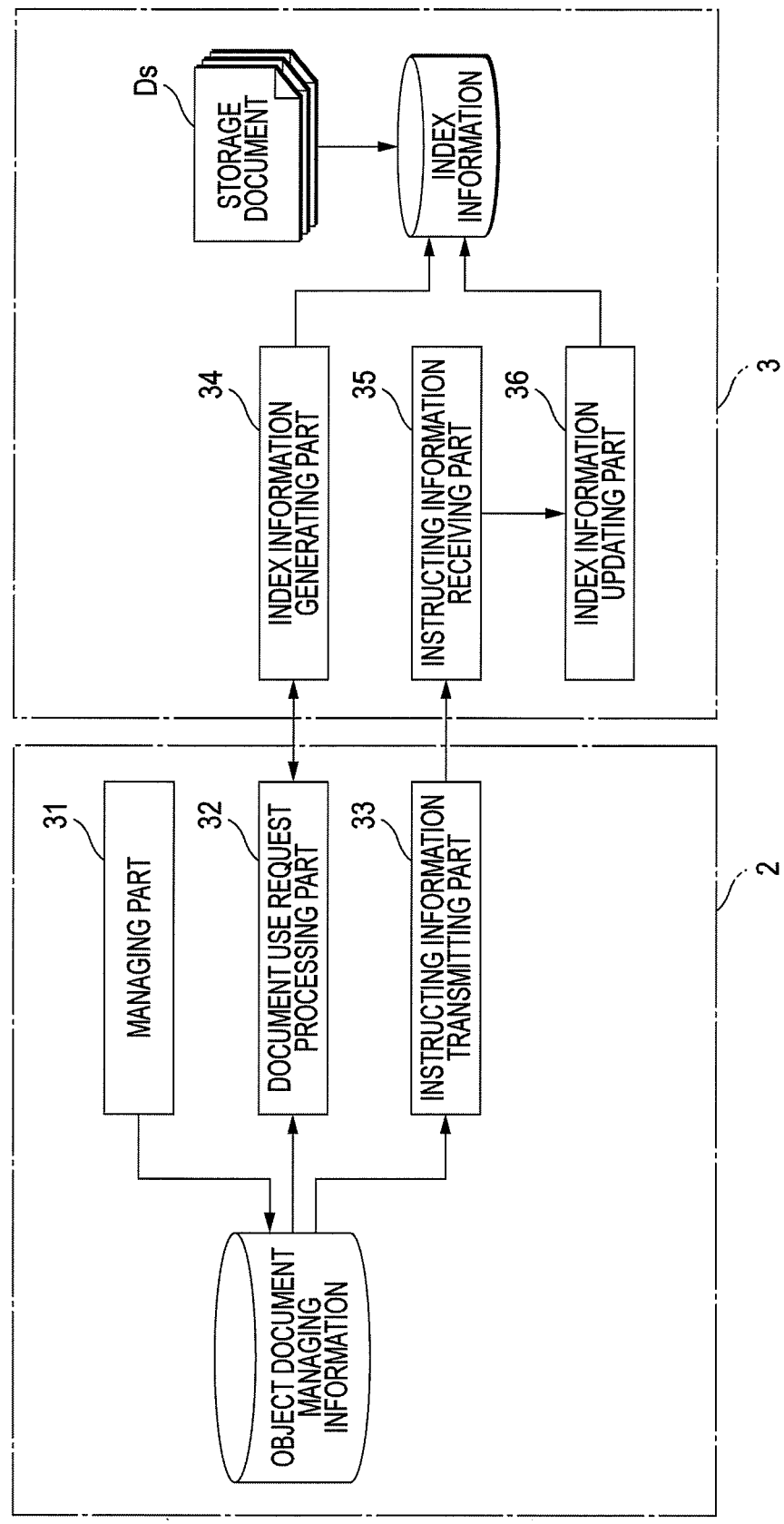
FIG. 2 is a functional block diagram showing the functions of the document managing system according to the embodiment of the present invention.

Now, functions realized by the document managing system 1 in this embodiment will be described below. As shown in FIG. 2, the document use controller 2 functionally includes a managing part 31, a document use request processing part 32 and an instructing information transmitting part 33. These functions can be realized by, for instance, executing the program stored in the storing part 12 by the control part 11.

Further, the document storage device 3 functionally includes, as shown in FIG. 2, index information generating part 34, instructing information receiving part 35 and an index information updating part 36. These functions are realized by, for instance, executing the program stored in the storing part 22 by the control part 21.

The managing part 31 manages information (object document managing information) about one or a plurality of object documents Dt as objects to be controlled by the document use controller 2. The object document managing information is information that coordinates together an object document identifier for identifying each object document Dt, information (a use rule) about the permission or the inhibition of the use of the object document Dt identified by the object document identifier and an identifier (a storage document identifier) of a storage document corresponding to the object document Dt. Specifically, the managing part 31 records the object document managing information of a new document Dt in the recording part 12 or updates the recorded object document managing information in accordance with a request from the user terminal 4 or the document storage device 3.

Here, the object document Dt is a document the permission or the inhibition of a use of which is controlled by the document use controller 2. The object document Dt may be electronic data including various kinds of contents except a sentence. However, in this embodiment, a character string to be searched is included as contents thereof.

Further, the use rule is information for determining whether or not the object document Dt is permitted to be used and includes, in this embodiment, information (index use permit/inhibit information) showing whether or not index information including the contents of the object document Dt is permitted to be used. The use rule may include, for instance, information showing whether or not the object document is permitted to be used, for instance, for reading, editing or copying the object document, or information such as a read permission period, the limited number of times of copying operations, etc. Further, the use rule may include information for determining the permission or the inhibition to read or copy the object document respectively for users.

The index use permit/inhibit information is information for determining whether or not the index information including the contents of the corresponding object document Dt is permitted to be used, and designates information such as a flag value showing the permission or the inhibition of the use of the index information. The index use permit/inhibit information can be adapted to change in accordance with information (for instance, information showing a start date and an end date of a permission period) showing a period during which the index information including the contents of the object document Dt is permitted to be used.

Further, the storage document identifier designates information for identifying the storage document Ds in the document storage device 3 when the document storage device 3 stores the object document Dt as the storage document Ds (when the object document Dt corresponds to the storage document Ds). Specifically, for instance, the storage document identifier may be a combination (refer it to as a "storage place information") of a folder name in which the document storage device 3 stores the storage document Ds and a document name for specifying the document in a folder. Otherwise, any information by which the document storage device 3 can identify the document may be used. The storage place information will be used below as the storage document identifier.

The document storage device 3 may sometimes store the documents of the same contents in a plurality of storage places as different storage documents Ds. For instance, when a plurality of certain object documents Dt are stored in different storage places in the document storage device 3, a plurality of storage place information for specifying respectively the plurality of storage places that are coordinated with the document identifiers of the object documents Dt are held in the object document managing information.

FIG. 3 is a diagram showing one example of the contents of the object document managing information held by the document use controller 2. In FIG. 3, other use rules than the index use permit/inhibit information are omitted and the index use permit/inhibit information is considered to be the flag value showing the permission or the inhibition of the use of the index information. In the example shown in FIG. 3, the object document Dt identified by the object document identifier "ABCD-0123" is permitted to use the index information and is stored as the storage document Ds of the document name of a "document 1" in the folder of a "folder 1" in the document storage device 3. Further, the object document Dt identified by the object document identifier "EFGH-4567" is not permitted to use the index information and is stored in two places of folders of a "folder 1" and a "folder 2" with the same document names of a "document 2" in the document storage device 3.

The managing part 31 adds the information of a new object document Dt to the object document managing information in accordance with a request for registering the new object document Dt. Specifically, for instance, when a user such as a creator who newly creates an object document Dt or a person having a copyright of the object document Dt (refer the user to as an owner of the object document Dt, hereinafter) requests to register the object document Dt, the managing part 31 issues a new object document identifier for identifying the object document Dt. Then, a use rule that is coordinated with the issued object document identifier and determined in accordance with the contents of an instruction of the owner is added to the object document managing information. The object document identifier issued by the managing part 31 is embedded in the object document Dt together with connect destination information (for instance, an IP address or a host name, a port number of a service, etc.) showing the connect destination of the document use controller 2.

Further, when the owner of the object document Dt requests to change the use rule, the managing part 31 updates the use rule coordinated with the object document identifier of the object document Dt in accordance with the contents of the instruction of the owner. Further, when the managing part receives from the document storage device 3 a report that the document storage device newly stores the storage document Ds corresponding to the object document Dt, the managing part 31 adds the storage place information for specifying the newly stored storage document Ds by coordinating with the object document identifier of the object document Dt.

The document use request processing part 32 receives a request for using the object document Dt registered in the object document managing information from the document storage device 3 or the user terminal 4. Then, the document use request processing part 32 decides the permission or the inhibition of the use of the object document Dt on the basis of the use rule to return a decided result to the device that requests to use the object document Dt.

As a specific example, a case will be described below that the object document Dt is stored in the document storage device 3 and the document storage device 3 receives a request for reading the object document Dt from the user terminal 4. In this case, the document storage device 3 transmits the request for reading the object document Dt to the document use controller 2 together with the object document identifier embedded in the object document Dt. At this time, the document storage device 3 refers to the connect destination information embedded in the object document Dt to specify the connect destination of the document use controller 2. The document use request processing part 32 decides whether or not the object document Dt is permitted to be read on the basis of the use rule registered in the object document managing information by coordinating with the transmitted object document identifier and returns a decided result to the document storage device 3. When the document storage device 3 receives the decided result that the object document Dt is permitted to be used, the document storage device 3 carries out a process that allows the user of the user terminal 4 to read the object document Dt. When the document storage device 3 receives the decided result that the object document Dt is not permitted to be used, the document storage device 3 stops a reading process of the object document Dt. Thus, also in the document storage device 3, a limitation of use according to the use rule held in the document use controller 2 is carried out for the object document Dt.

When the index use permit/inhibit information included in the object document managing information changes, the instructing information transmitting part 33 transmits to the document storage device 3 instructing information that updates the index information so as to change the permission or the inhibition of the use of the contents of the storage document Ds identified by the storage document identifier coordinated with the index use permit/inhibit information in accordance with the change. That is, when the permission or the inhibition of the use of the index information of a certain object document Dt that is determined by the index use permit/inhibit information changes from a permission to a non-permission, the instructing information transmitting part 33 transmits the instructing information (refer it to as use stop instructing information, hereinafter) for updating the index information so as to make the use of the contents of the storage document Ds impermissible. On the other hand, when the permission or the inhibition of the use of the index information changes from the non-permission to the permission, the instructing information transmitting part 33 transmits to the document storage device 3 the instructing information (refer it to as use start instructing information, hereinafter) for updating the index information so as to permit the use of the contents of the storage device Ds. In a specific example described below, the use stop instructing information designates instructing information for instructing to delete the contents of the storage document Ds from the index information, and the use start instructing information designates instructing information for instructing to add the contents of the storage document Ds to the index information.

A case that the index use permit/inhibit information changes includes, for instance, a case that the managing part 31 changes the flag value in accordance with the request of the owner of the object document Dt. That is, when the owner of the object document Dt changes so as to make impermissible the use of the index information that is permitted so far, the instructing information transmitting part 33 transmits the use stop instructing information to the document storage device 3. On the other hand, when the owner changes so as to make permissible the use of the index information that is not permitted so far, the instructing information transmitting part 33 transmits the use start instructing information to the document storage device 3.

As the case that the index use permit/inhibit information changes, a case that a prescribed period elapses may be considered. For instance, in the document use controller 2, a period during which the use of the index information of the object document Dt is permitted is set, and when the period elapses, the index use permit/inhibit information can be designed to change from the permission to the non-permission.

At this time, the instructing information transmitted by the instructing information transmitting part 33 includes the identifier of the storage document Ds as an object to be instructed (here, the storage place information for specifying the storage place in the document storage device 3) as well as an instruction for adding or deleting the index information. Namely, when the index use permit/inhibit information coordinated with a certain object document Dt, the storage document Ds to be instructed is specified by the storage place information that is coordinated with the index use permit/inhibit information and held in the object document managing information. When a plurality of storage place information are coordinated with one object document Dt, the instructing information is transmitted by considering the plurality of storage documents Ds respectively specified by the plurality of storage place information as the objects to be instructed.

The index information generating part 34 generates the index information including the contents of the plurality of storage document Ds stored by the document storage device 3. For instance, the index information designates information in which the storage document Ds including words or character strings and information showing the positions of the words or the character strings in the storage document Ds are recorded respectively for the words or the character strings of a prescribed length, and is used to search each storage document Ds.

Here, when the storage document Ds as an object whose index information is generated is the object document Dt registered in the document use controller 2, the index information generating part 34 inquires the above-described document use request processing part 32 about whether or not the contents of the object document Dt may be included in the index information. The document use request processing part 32 refers to the index use permit/inhibit information of the inquired object document Dt to decide whether or not the index information is permitted to be generated and returns a decided result to the document storage device 3. The index information generating part 34 includes only the contents of the object document Dt whose index information is permitted to be generated in the index information in accordance with the decided result. That is, the contents of the object document Dt whose index information is not permitted to be generated are not included in the index information. As a result, the user of the document storage device 3 cannot search the object document Dt.

The index information generating part 34 generates the index information including the contents of the storage document Ds stored at that time at a prescribed timing such as a case, for instance, when the index information generating part 34 is instructed by a manager of the document storage device 3. Further, when a new storage document Ds is stored in the document storage device 3, the contents of the storage document Ds may be added each time to the already generated index information. The index information generated by the index information generating part 34 is held in the storing part 12.

When the above-described instructing information transmitting part 33 transmits the instructing information to the document storage device 3, the instructing information receiving part 35 receives this instructing information.

The index information updating part 36 updates the index information held in the storing part 12 in accordance with the instructing information received by the instructing information receiving part 35. Here, the index information updating part 36 updates the index information so as to change the permission or the inhibition of the use of the contents of the storage document Ds on the basis of the identifier (here, the storage place information) of the storage document Ds included in the instructing information received by the instructing information receiving part 35. Specifically, for instance, when the use stop instructing information of a certain storage document Ds is transmitted, the index information updating part 36 deletes the contents of the storage document Ds from the index information. Further, when the use start instructing information of a certain storage document Ds is transmitted, the index information updating part 36 newly adds the contents of the storage document Ds to the index information.

Now, a specific example of a flow of processes will be described below that are carried out by the document use controller 2 and the document storage device 3 having the above-described functions.

Figure 4:
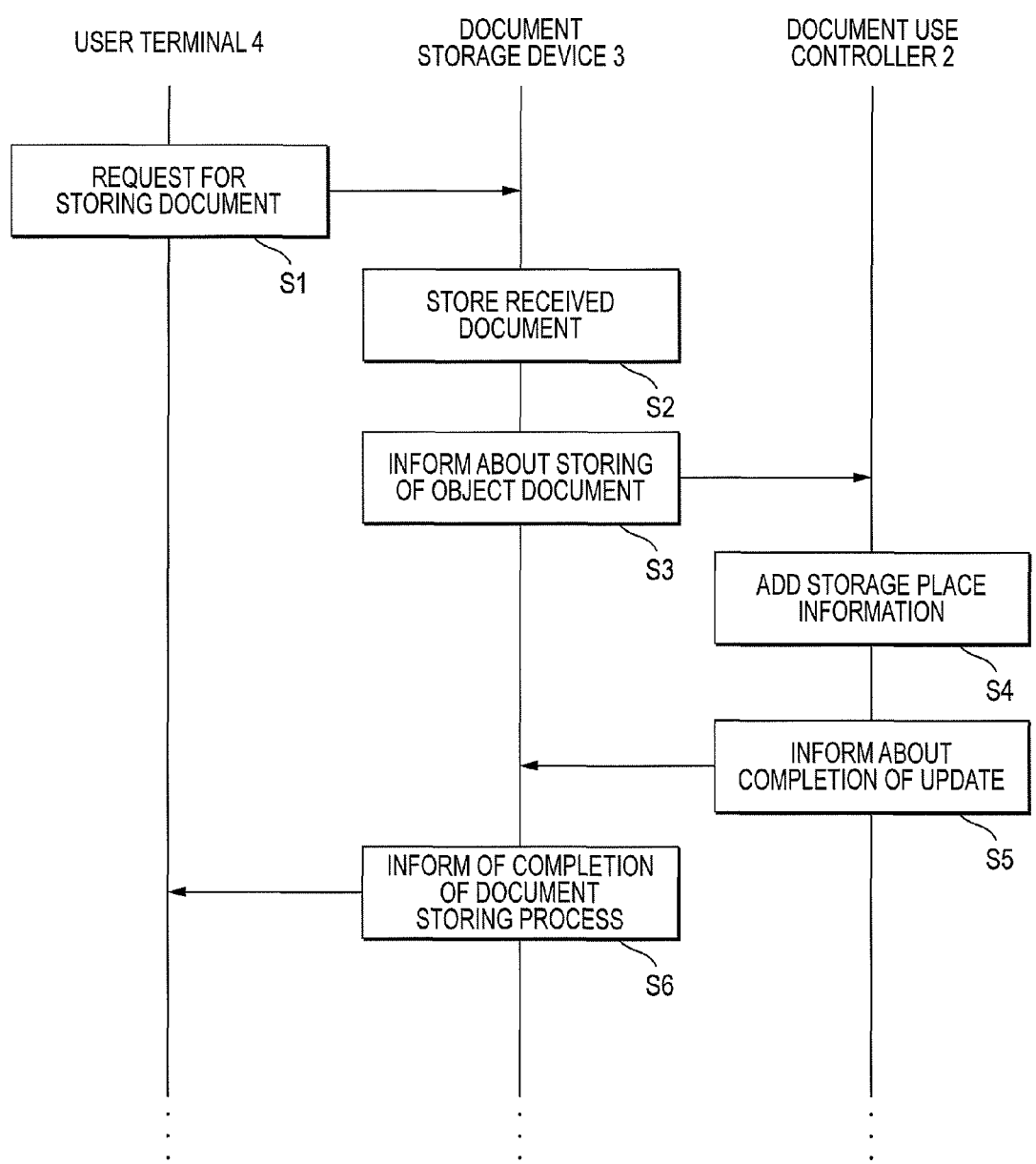
FIG. 4 is a flowchart showing one example of a flow of a document storing process carried out by the document managing system according to the embodiment of the present invention.

Initially, one example of a document storing process is described that the document storage device 3 stores a new document as a storage document Ds in accordance with a request from the user terminal 4 by referring to a flowchart shown in FIG. 4. In an example of a flow shown in FIG. 4, the newly stored document is already designated as an object to be controlled by the document use controller 2 and the object document identifier is embedded therein.

Firstly, the user terminal 4 transmits a request for storing a document to the document storage device 3 together with data of the object document Dt as an object to be stored and the designation of the storage place (S1). The document storage device 3 that receives the request for storing the document of the S1 stores the received object document Dt in the designated storage place as the new storage document Ds (S2).

Subsequently, the document storage device 3 transmits to the document use controller 2 a report of storing the object document for informing that the document storage device stores the object document Dt (S3). In the report of storing the object document, included are the object document identifier embedded in the newly stored object document Dt and the storage place information for specifying the storage place where the object document Dt is stored in the S2. The managing part 31 of the document use controller 2 that receives the report of storing the object document of the S3 carries out an updating process for adding the reported storage place information to the object document managing information by coordinating with the reported object document identifier (S4). After the managing part carries out the updating process, the managing part 31 transmits a report of completing the updating process to the document storage device 3 (S5). The document storage device 3 that receives the report of completing the updating process from the document use controller 2 transmits to the user terminal 4 a report of completing the document storing process (S6).

Figure 5:
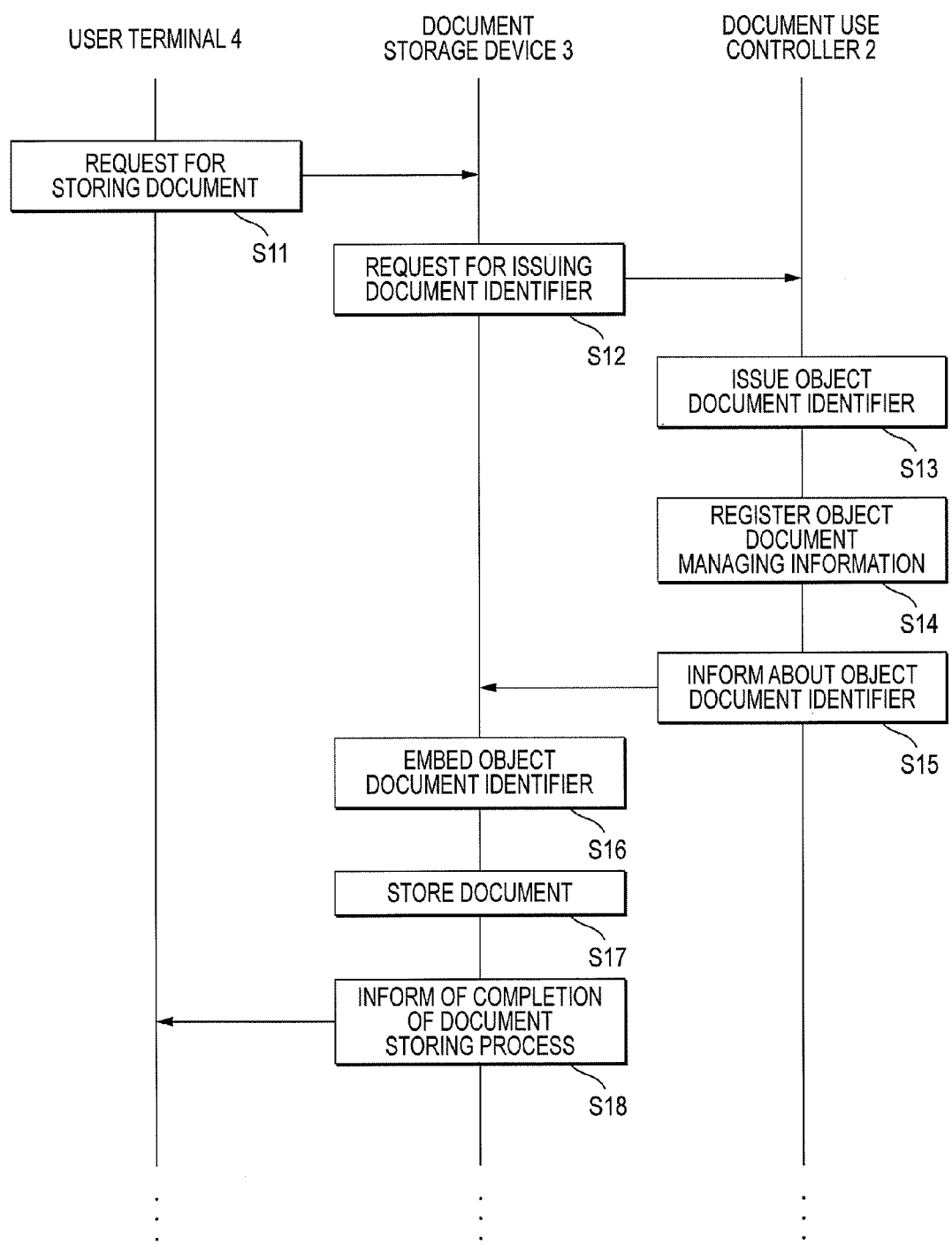
FIG. 5 is a flowchart showing another example of a flow of the document storing process carried out by the document managing system according to the embodiment of the present invention.

Now, another example of the document storing process is described by referring to a flowchart shown in FIG. 5. In the example of a flow shown in FIG. 5, a document newly stored in the document storage device 3 is not yet designated as an object to be controlled by the document use controller 2 and is to be stored in the document storage device 3 and registered in the document use controller 2 as an object document. In the example shown in FIG. 5, the storage document Ds stored in the document storage device 3 is always registered in the document use controller 2 as the object document Dt.

Firstly, the user terminal 4 transmits a request for storing a document to the document storage device 3 together with data of the document as an object to be stored and the designation of the storage place (S11). The document storage device 3 that receives the request for storing the document of the S11 transmits to the document use controller 2 a request for issuing the document identifier of a new document transmitted in the S11 (S12). In the request for issuing the document identifier, is included information about the designation of the storage place included in the request for storing the document in the S1. In the example of this flow, connect destination information of the document use controller 2 as the transmit destination of the request for issuing the document identifier is to be previously registered in the document storage device 3.

The managing part 31 of the document use controller 2 that receives the request for issuing the document identifier of the S12 issues the object document identifier to the requested document (S13). Then, the managing part 31 coordinates the object document identifier issued in the S13 with the storage place information included in the request for issuing the document identifier received in the S12 and newly registers the object document identifier in the object document managing information (S14). At this time, the use rule of the newly registered object document Dt may be a predetermined initial setting value, or the storage place designated by the user together with the request for storing the document in the S11. The managing part 31 that registers the object document managing information informs the document storage device 3 of the object document identifier issued in the S13 (S15).

The document storage device 3 that receives the report of the S15 embeds the reported object document identifier in the new document received in the S11 (S16). Then, the document storage device 3 stores the document in which the object document identifier is embedded in the storage place designated in the S11 as the new storage document Ds (S17). After the process of the S17, the document storage device 3 transmits a report of completing the document storing process to the user terminal 4 (S18).

Now, one example of a flow of an index information deleting process will be described that when the permission or the inhibition of the use of the index information of the object document Dt whose use is controlled by the document use controller 2 changes, the contents of the object document Dt are deleted from the index information in the document storage device 3, by referring to a flowchart shown in FIG. 6. Here, it is assumed that the index use permit/inhibit information designates flag values showing the permission or the inhibition of the use of the index information and the owner of the object document Dt who uses the user terminal 4 requests the document use controller 2 to change the flag values.

Firstly, the user terminal 4 transmits a request for changing the use rule to the document use controller 2 (S21). It is assumed that this request for a change designates an instruction to change the flag value showing the permission of the use of the index information to the flag value showing a non-permission.

The managing part 31 of the document use controller 2 that receives the request for the change of the S21 updates the index use permit/inhibit information recorded in the object document managing information by coordinating with the object document identifier of the object document Dt to the flag value showing the non-permission (S22). When the process of the S22 is completed, the instructing information transmitting part 33 of the document use controller 2 reads the storage place information coordinated with the object document identifier of the object document Dt in the object document managing information (S23).

Subsequently, the instructing information transmitting part 33 transmits the use stop instructing information of the storage document Ds stored in the storage place specified by the storage place information (S24). The instructing information receiving part 35 of the document storage device 3 receives the instructing information transmitted in the S24 (S25). Then, the index information updating part 36 carries out an updating process for deleting the contents of the storage document Ds designated by the instructing information received in the S25 (S26) and informs the document use controller 2 of a completed result thereof.

Further, the instructing information transmitting part 33 of the document use controller 2 decides whether or not the instructing information is transmitted for all of the storage place information read in the S23. When a plurality of storage place information are held by coordinating with the object document Dt, the same object document Dt is stored in the document storage device 3 as a plurality of storage documents Ds. Thus, the instructing information transmitting part 33 returns to the S24 to repeat a process for transmitting the instructing information for the storage documents Ds that are not yet designated as objects to be instructed. Thus, even when the object document Dt is stored in the document storage device 3 as the plurality of storage documents Ds, the index information is deleted for all of them.

In S27, when the instructing information transmitting part 33 decides that the instructing information is transmitted for all the storage place information read in the S23, the document use controller 2 transmits a report of completing the change of the use rule to the user terminal 4 that transmits the request for changing the use rule in the S21.

Figure 6:
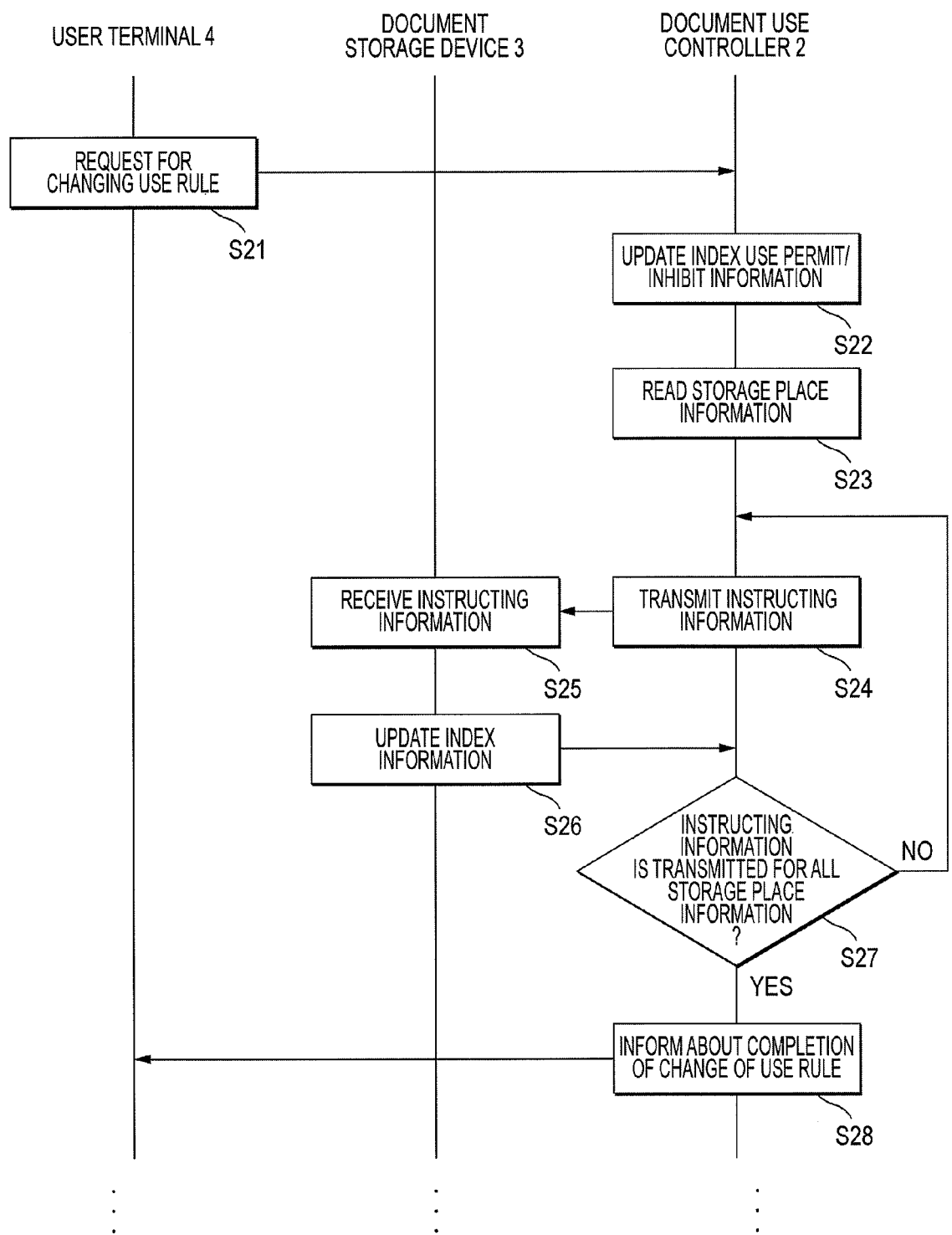
FIG. 6 is a flowchart showing one example of an index information deleting process carried out by the document managing system according to the embodiment of the present invention.

The flow of FIG. 6 described above shows the example of the index information deleting process that the contents of the object document Dt are deleted from the index information in the document storage device 3, however, an index information adding process that the contents of the object document Dt are added to the index information in the document storage device 3 is also realized by the same procedure.

Namely, when there is a request for changing the flag value showing that the use of the index information of the object document Dt is not permitted to the flag value showing the permission, the managing part 31 updates the index use permit/inhibit information recorded in the object document managing information by coordinating with the object document identifier of the object document Dt to the flag value showing the permission. Accordingly, the instructing information transmitting part 33 transmits the use start instructing information to the document storage device 3 for all the storage place information coordinated with the object document Dt. In accordance with the instructing information, the index information updating part 36 of the document storage device 3 carries out an updating process for adding the contents of the designated storage document Ds to the index information.

Also in this index information adding process, when the object document Dt is stored in the document storage device 3 as the plurality of storage documents Ds, the contents of the plurality of storage documents Ds are respectively independently added to the index information. Thus, the user of the document storage device 3 can search all of the plurality of storage documents Ds whose contents are common.

As described above, according to this embodiment, when the permission or the inhibition of the use of the index information of a certain object document Dt changes in the document use controller 2, the use stop instructing information or the use start instructing information for the storage document Ds stored in the storage place specified by the storage place information coordinated with the object document Dt is transmitted to the document storage device 3. Thus, the index information held by the document storage device 3 is updated so as to make impermissible the use of the contents of the object document Dt whose index information is not permitted to be used, and make permissible the use of the contents of the object document Dt whose index information is permitted to be used.

The embodiment of the present invention is not limited to the above-described embodiment. For instance, in the explanation made so far, the number of both the document use controller 2 and the document storage device 3 is respectively set to one. However, a plurality of the devices may be respectively provided. For instance, when the plurality of document storage devices 3 are connected to the document use controller 2, the storage place information included in the object document managing information may include information (for instance, a server name or the like) showing in which document storage device 3 of the plurality of document storage devices 3 the object document Dt is stored. Thus, even when a certain object document Dt is distributed and stored in the plurality of document storage devices 3, the instructing information is transmitted respectively to the plurality of document storage devices 3 for storing the object document Dt as the storage documents Ds in accordance with the change of the permission or the inhibition of the use of the index information including the contents of the object document Dt. As a result, for instance, when the index use permit/inhibit information changes so as to make the use of the index information impermissible, the contents of the object document Dt are deleted from all the index information respectively held by the document storage devices 3.

Further, in the above-described explanation, the index information updating part 36 deletes the contents of the storage document Ds as an object to be instructed from the index information in accordance with the use stop instructing information, and adds the contents of the storage document Ds as an object to be instructed to the index information in accordance with the use start instructing information. However, the index information updating part 36 may update the index information in other form than the above-described form. For instance, the index information may hold flag information showing whether or not the contents of the storage document Ds are used as a part of the index information respectively for the storage documents Ds, and the index information updating part 36 may update the flag information held in the storage document Ds as an object to be instructed in accordance with the use stop instructing information or the use start instructing information. Thus, when the index use permit/inhibit information coordinated with the object document Dt is changed to the contents showing a non-permission, the index information is updated so as to make impermissible the use of the contents of the storage document Ds corresponding to the object document Dt. Further, when the index use permit/inhibit information coordinated with the object document Dt is changed to the contents showing a permission, the index information is updated so as to make permissible the use of the contents of the storage document Ds corresponding to the object document Dt.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A document managing system comprising:
a document use controller that holds information about permission/inhibition of a use of an object document, the information comprising index use permit/inhibit information that determines whether or not contents of the object document are used as index information, the document use controller including:
a managing unit that coordinates and manages an identifier of the object document, the index use permit/inhibit information that determines whether or not contents of the object document are used as index information, and an identifier of a storage document corresponding to the object document; and
an instructing information transmitting unit that transmits instructing information including the identifier of the storage document coordinated with the index use permit/inhibit information to a document storage device in accordance with a change of the index use permit/inhibit information; and
the document storage device that stores a plurality of storage documents including the storage document corresponding to the object document, the document storage device including:
an index information holding unit that holds the index information including contents of the plurality of storage documents;
an instructing information receiving unit that receives the instructing information transmitted from the document use controller; and
an index information updating unit that updates the index information held by the index information holding unit,
wherein the index information updating unit updates the index information to change permission/inhibition of a use of the contents of the storage document on the basis of the identifier of the storage document included in the instructing information received by the instructing information receiving unit.

2. The document managing system as claimed in claim 1, wherein the index use permit/inhibit information changes after a prescribed period elapses.

* * * * *